US012794237B2

(12) United States Patent
Clydesdale

(10) Patent No.: US 12,794,237 B2
(45) Date of Patent: Nov. 10, 2026

(54) ONSITE INTEGRATED ENERGY POWER AND ELECTRIC VEHICLE CHARGING SYSTEM AND METHOD

(71) Applicant: Paficic Inc., Orillia (CA)

(72) Inventor: Craig Clydesdale, Oakville (CA)

( * ) Notice: Subject to any disclaimer, the term of this patent is extended or adjusted under 35 U.S.C. 154(b) by 799 days.

(21) Appl. No.: 18/146,231

(22) Filed: Dec. 23, 2022

(65) Prior Publication Data

US 2023/0208146 A1 Jun. 29, 2023

Related U.S. Application Data

(60) Provisional application No. 63/293,282, filed on Dec. 23, 2021.

(51) Int. Cl.

*H02J 3/38* (2026.01)
*B60L 53/62* (2019.01)
*B60L 53/63* (2019.01)
*B60L 53/68* (2019.01)
*G05B 19/042* (2006.01)
*H02J 9/06* (2006.01)

(52) U.S. Cl.

CPC .............. *H02J 3/381* (2013.01); *B60L 53/62* (2019.02); *B60L 53/63* (2019.02); *B60L 53/68* (2019.02); *G05B 19/042* (2013.01); *H02J 9/06* (2013.01); *G05B 2219/2639* (2013.01)

(58) Field of Classification Search

None

See application file for complete search history.

(56) References Cited

U.S. PATENT DOCUMENTS 9,193,266 B2 11/2015 Arumugam
11,183,843 B1 * 11/2021 Cooper .................. H02J 3/322
11,967,857 B1 * 4/2024 Cooper .................. H02J 3/007
2011/0204720 A1 * 8/2011 Ruiz .................... B60L 53/305 307/66
2012/0091970 A1 4/2012 Cho et al.
2012/0267951 A1 * 10/2012 Pifer ...................... H02J 9/06 307/64
2014/0088781 A1 * 3/2014 Kearns .................. H02J 13/12 700/295
2015/0329000 A1 * 11/2015 Kim ...................... B60L 3/00 320/109
2018/0075548 A1 * 3/2018 Madonna ............... H02J 3/008
2020/0161859 A1 * 5/2020 Bell ........................ H02J 3/14
2020/0286191 A1 * 9/2020 Bazhinov .............. H02B 1/056

* cited by examiner

*Primary Examiner* — Ariel Mercado-Vargas

(74) *Attorney, Agent, or Firm* — Own Innovation Inc.; James W. Hinton; Sanjeevan Shivakumar

(57) ABSTRACT

There is provided an on-site integrated energy power and electric vehicle (EV) charging system. The system includes a plurality of power loads. The plurality of power loads includes at least a first building and an electric charger module including at least a first EV charger for charging an electric vehicle when coupled to the EV charge. The system also includes at least a first power source to provide power to the plurality of power loads and a digital control module (DCM) power distribution system.

16 Claims, 5 Drawing Sheets

ONSITE INTEGRATED ENERGY POWER AND ELECTRIC VEHICLE CHARGING SYSTEM AND METHOD

TECHNICAL FIELD

The embodiments disclosed herein relate generally to power generation and supply, and, in particular to systems, devices, and methods for enabling a private utility to intelligently manage variable loads in a multi-load system including at least one electric vehicle charger.

INTRODUCTION

Energy requirements across the world are evolving. Electricity generated by the public electrical grid may rely on centralized, inefficient, and unreliable power sources.

The public electrical grid may have difficulties in meeting increasing energy demands. The public electrical grid may be susceptible to power outages (e.g. severe weather events, physical and cyber threats, operations error, etc.). Antiquated infrastructure may need constant capital investment to maintain, increasing costs for businesses. Current methods of electricity production and generation may not be environmentally friendly.

An onsite, off-grid private utility at a building can overcome at least some of the disadvantages of current systems. Where a building also provides an electric vehicle charging station the private utility system needs to be able to manage the power requirements of these variable loads to ensure a high level of resilience within the system. Current utility systems are not capable of coping with frequency fluctuations which can occur as power load demands increase. Adding electric vehicle chargers to a location often increase the power needs at the location beyond the scope of the offsite on-grid utility.

Accordingly, there is a need for systems and methods for power generation that enable optimization of power delivery to a hybrid building and electric vehicle charger location in an affordable, reliable, instantaneous, and sustainable manner.

SUMMARY

There is provided an on-site integrated energy power and electric vehicle (EV) charging (IEP-EV) system. The system includes a plurality of power loads.

The plurality of power loads includes at least a first building and an electric charger module including at least a first electric vehicle (EV) charger for charging an electric vehicle when coupled to the EV charger.

The system also includes at least a first power source to provide power to the plurality of power loads, and a digital control module (DCM) power distribution system.

The DCM power distribution system includes a DCM control subsystem communicatively coupled to the first power source, the first building, and the electric charger module.

The DCM control subsystem is configured to receive first power source data from the first power source, the first power source data including at least power availability data of the first power source; receive load data from the first building and the first electric charger module, the load data including at least power requirement data of the first building and the electric charger module; and determine, based on the first power source data and the load data, a plurality of power amounts to send to each of the plurality of power loads respectively, including a first power amount to the first building and a second power amount to send to at least the first EV charger of the electric charger module.

The DCM power distribution system also includes a DCM power subsystem electrically coupled to the first power source, the first building, and the electric charger module.

The DCM power subsystem is configured to receive power from the first power source and send the first power amount to the first building and the second power amount to the electric charger module.

The on-site IEP-EV system may also include an application interface platform for monitoring the IEP-EV system from offsite.

The DCM control subsystem may include a programmable logic controller for receiving the first power source data and the load data and determining at least the first power amount and the second power amount.

The DCM control subsystem may include a chip-based control system.

Each power load of the plurality of power loads may be assigned a hierarchical value and the DCM control subsystem may determine the plurality of power amounts using the hierarchical values of each power load.

The electric charger module may include an electric charger module (ECM) master supervisor device communicatively coupled to each of the first EV charger, at least a second EV charger, and the DCM control subsystem.

The ECM master supervisor device may be configured to receive load data from at least the first and second EV chargers and transmit the load data to the DCM control subsystem The DCM control subsystem may determine the plurality of power amounts to be sent to the electric charger module including a second power amount to be sent to the first EV charger and a third power amount to be sent to the second EV charger.

The on-site IEP-EV system may also include a second power source which is redundant with the first power source, wherein the DCM power subsystem is configured to receive power from the second power source.

The DCM control subsystem may determine the plurality of power amounts based on additional data, wherein the additional data includes at least one of historical load data from the plurality of power loads, weather data, and temperature data.

In another aspect, there is provided a computer system for intelligently adapting to variable power loads for an IEP-EV system.

The computer system comprises a memory in communication with a processor, the memory storing power source data and power load data for at least two power loads, the power source data including at least available power data for at least one power source, and the power load data including at least required power data for the at least two power loads; and a power amount determination module for execution by the processor, and the processor configured to execute the power amount determination module to analyze the power source data and the power load data and to determine a plurality of power amounts to send to the at least two power loads.

The memory may further store power load hierarchy data and wherein the processor is further configured to analyze the power source data and the power load data with respect to the power load hierarchy data to determine the plurality of power amounts.

In another aspect, there is provided a method of enabling a private utility at a building with an electric charger module including at least a first charger for charging electric vehicles The method includes providing a plurality of onsite power sources, wherein a first power source is enabled to provide power to at least the building and the first charger; determining a first power requirement of the building and a second power requirement of the electric charger module; determining a first power availability of the first power source; and adjusting a first amount of power provided to the building and a second amount of power provided to the at least a first charger based on the first power availability, the first power requirement, and the second power requirement.

The building and the first charger may be assigned a first hierarchical value and a second hierarchical value, respectively, and wherein changing the first amount of power and the second amount of power is further based on the first hierarchical value and the second hierarchical value.

A second power source may be enabled to provide power to the building and the electric charger module when the first power source is disabled.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
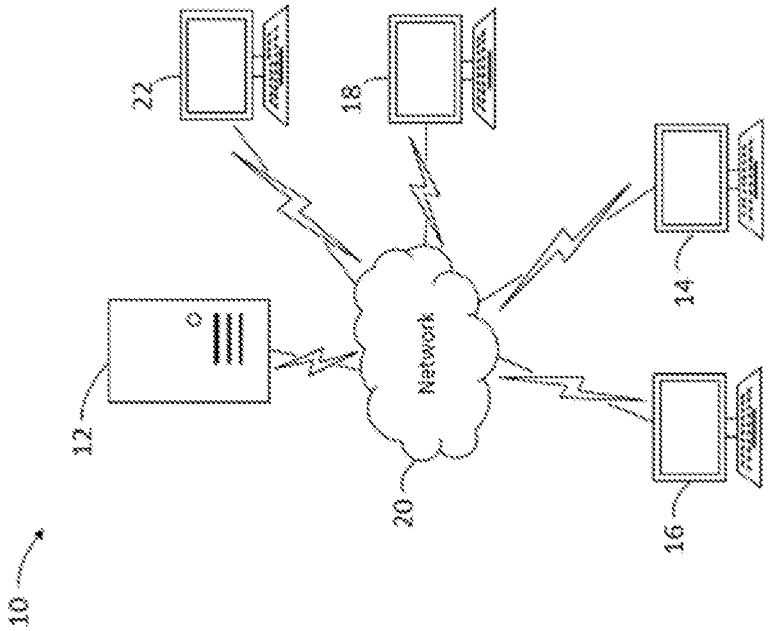
FIG. 1 is a schematic diagram of a system for enabling a private utility at a building with an electric vehicle charging station, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The present disclosure provides a dedicated energy system for a building and an associated electric vehicle charging station. The dedicated energy system provides a viable energy alternative to the public grid. The dedicated energy system provides power to the building and to electric vehicles. The building may be an industrial facility such as a manufacturing plant. The building may be a residential building such as an apartment building. The dedicated energy system may be considered a "private utility" for the building.

Referring now to FIG. 1, shown therein is a block diagram illustrating a system 10, in accordance with an embodiment. The system 10 includes an application integration server platform 12, which communicates with a plurality of offsite devices 16, 18 and 22 via a network 20. The system 10 also includes a digital control module server platform 14, which can communicate with a plurality of onsite devices 24, 26 via the network 20. The onsite devices 24, 26 may include one or more intelligent end devices 24 and one or more subsystem devices 26. The application integration server platform 12 can communicate with the digital control server platform 14 via the network 20.

The application integration server platform 12 may be a purpose-built machine designed specifically for analyzing offsite (e.g. supply) and onsite (e.g. use) power source data and determining a preferred power source suggestion for the building.

The digital control module server platform 14 may be a purpose-built machine designed specifically for analyzing offsite (e.g. supply) and onsite (e.g. use) power source data and determining a preferred power source suggestion for the building, and for controlling the supply of power to the building according to results of the analysis.

The server platforms 12 and 14, and devices 16, 18 and 22 may be a server computer, desktop computer, notebook computer, tablet, PDA, smartphone, or another computing device. In an embodiment, the server platform 14 may include an embedded computer and an industrial programmable logic controller (PLC) or similar device, in communication with one another. The devices 12, 14, 16, 18, 22 may include a connection with the network 20 such as a wired or wireless connection to the Internet. In some cases, the network 20 may include other types of computer or telecommunication networks. In particular, the network 20 may include a plurality of networks, some of which may be private and/or secure. For example, the digital control server platform 14, the application integration server platform 12, and the onsite devices (or any combination thereof) may communicate with one another one or more private and/or secure networks.

The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 20.

Input device may include any device for entering information into device 12, 14, 16, 18, 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

Devices such as server platforms 12 and 14 and devices 16, 18 and 22 can be described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22 may send information to the server platforms 12 and 14. For example, a user using the device 18 may manipulate one or more inputs (e.g. a mouse and a keyboard) to interact with a user interface displayed on a display of the device 18. Generally, the device may receive a user interface from the network 20 (e.g. in the form of a webpage). Alternatively, or in addition, a user interface may be stored locally at a device (e.g. a cache of a webpage or a mobile application).

Server platform 12 may be configured to receive and send a plurality of information, to and from each of the plurality of offsite devices 16, 18, 22 and the server 14. Server platform 14 may be configured to receive and send a plurality of information to and from each of the plurality of onsite devices and the server 12. Generally, the information may comprise at least an identifier identifying the system provider, service provider, cold storage, or blockchain infrastructure computer. For example, the information may comprise one or more of a username, e-mail address, password, social media handle.

In response to receiving information, the server platform 12 may store the information in storage database. The storage may correspond with secondary storage of the devices 16, 18 and 22 and the server 14. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

Figure 2:
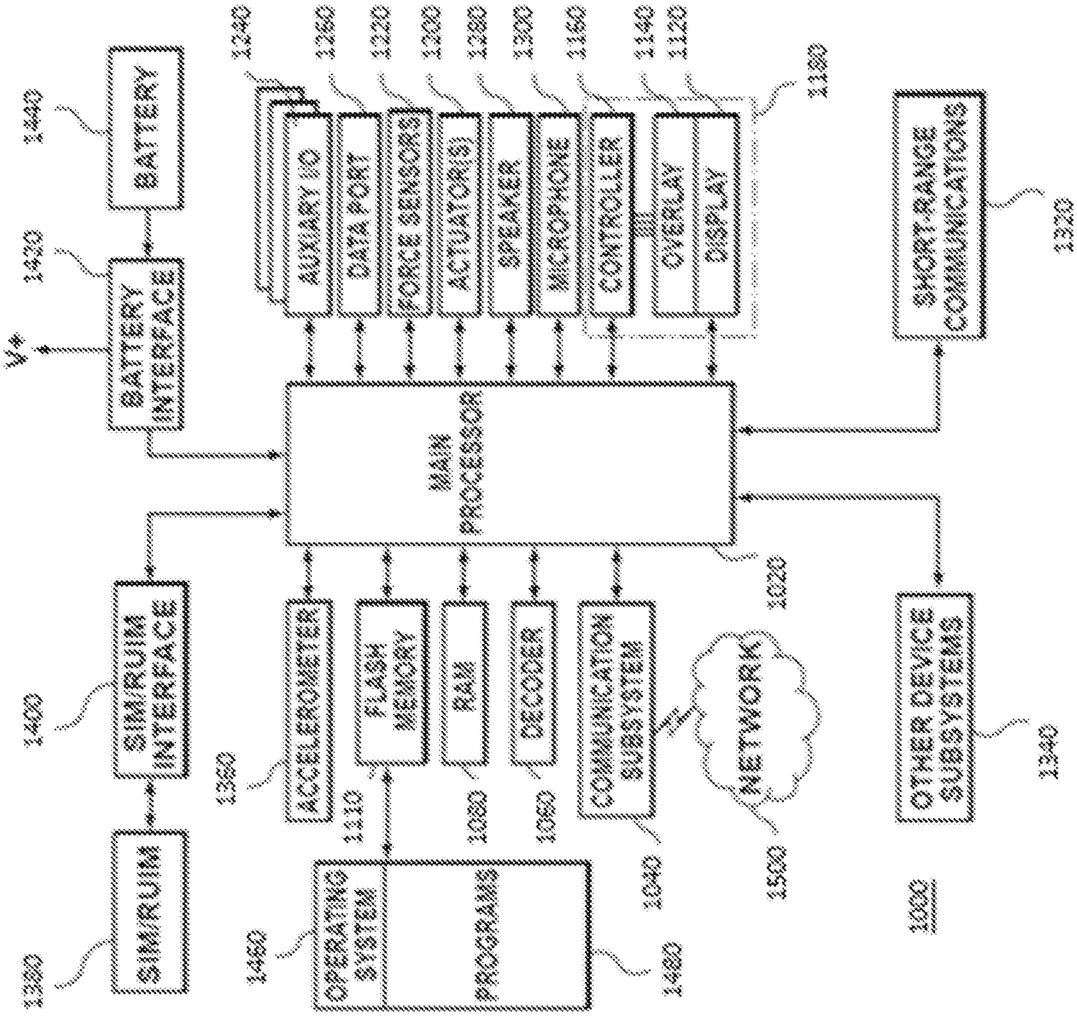
FIG. 2 is a block diagram of a computing device of the system of FIG. 1, according to an embodiment

FIG. 2 shows a simplified block diagram of components of a device 1000, such as a mobile device or portable electronic device. The device 1000 includes multiple components such as a processor 1020 that controls the operations of the device 1000. Communication functions, including data communications, voice communications, or both may be performed through a communication subsystem 1040. Data received by the device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 1. The accelerometer 1360 may be utilized for detecting direction of gravitational forces or gravity-induced reaction forces.

To identify a subscriber for network access according to the present embodiment, the device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The device 1000 also includes an operating system 1460 and software components 1480 that are executed by the processor 1020 and which may be stored in a persistent data storage device such as the flash memory 1100. Additional applications may be loaded onto the device 1000 through the wireless network 1500, the auxiliary I/O subsystem 1240, the data port 1260, the short-range communications subsystem 1320, or any other suitable device subsystem 1340.

For example, in use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

The present disclosure provides an intelligent power system and method. The system is an onsite integrated energy platform-electric vehicle charging system (IEP-EV system) which may entirely power at least one building and an associated electric vehicle charging station without requiring any input from a local energy/power utility. The electric vehicle charging station includes electric charger modules which can be added or removed as the demand at the building location changes. The system includes a plurality of power sources for delivering power to multiple power loads at a single location. The power loads include at least one building and at least one electric vehicle charging station. The power sources include one or more onsite power sources. The power sources may include an offsite power source (e.g. utility).

A computer system including at least one onsite computing device and an offsite computing device analyzes various power source data including external data, power supply data, and power load data and determines what amount of power from the available power supply can be directed to each of the power loads (e.g. the at least one building and the electric vehicles). Because the power loads on the system are transient the computer system acts to manage the flow of electricity in real-time to maintain resilience in the power system by properly managing the known capacity of the power system versus the current (and/or expected) power loads. The frequency at which the IEP-EV system operates must be maintained across the changing load requirements to minimize risks to the power sources and the power loads. Without a buffer between the current power load of the power system and the ultimate power capacity of the power system any sudden increase in power requirements may stall the system and result in unwelcome but preventable consequences. For example, if the power load requirements are greater than or approaching the magnitude of the available power, it is likely preferable for the system to temporarily halt charging EVs instead of stopping service to the building.

The offsite computing device may perform similar analysis and monitoring for multiple locations. The onsite computing device performs control operations to direct the flow of power such that the correct/desired amount of power is delivered to each load. The onsite computing device may direct power to the various power loads based on a hierarchy of the power loads wherein distributing power to certain power loads is prioritized over other power loads (e.g., a building is more important than an electric vehicle). Other control operations may include activating an inactive power source or altering the output of an active power source.

The IEP-EV system may be completely islanded from the local utility but may be capable of connecting the local utility grid if necessary or desired. Because the IEP-EV system is islanded and can be more tightly controlled, as described herein, it can be more fuel efficient than current utility systems, which can result in savings for users.

Figure 3:
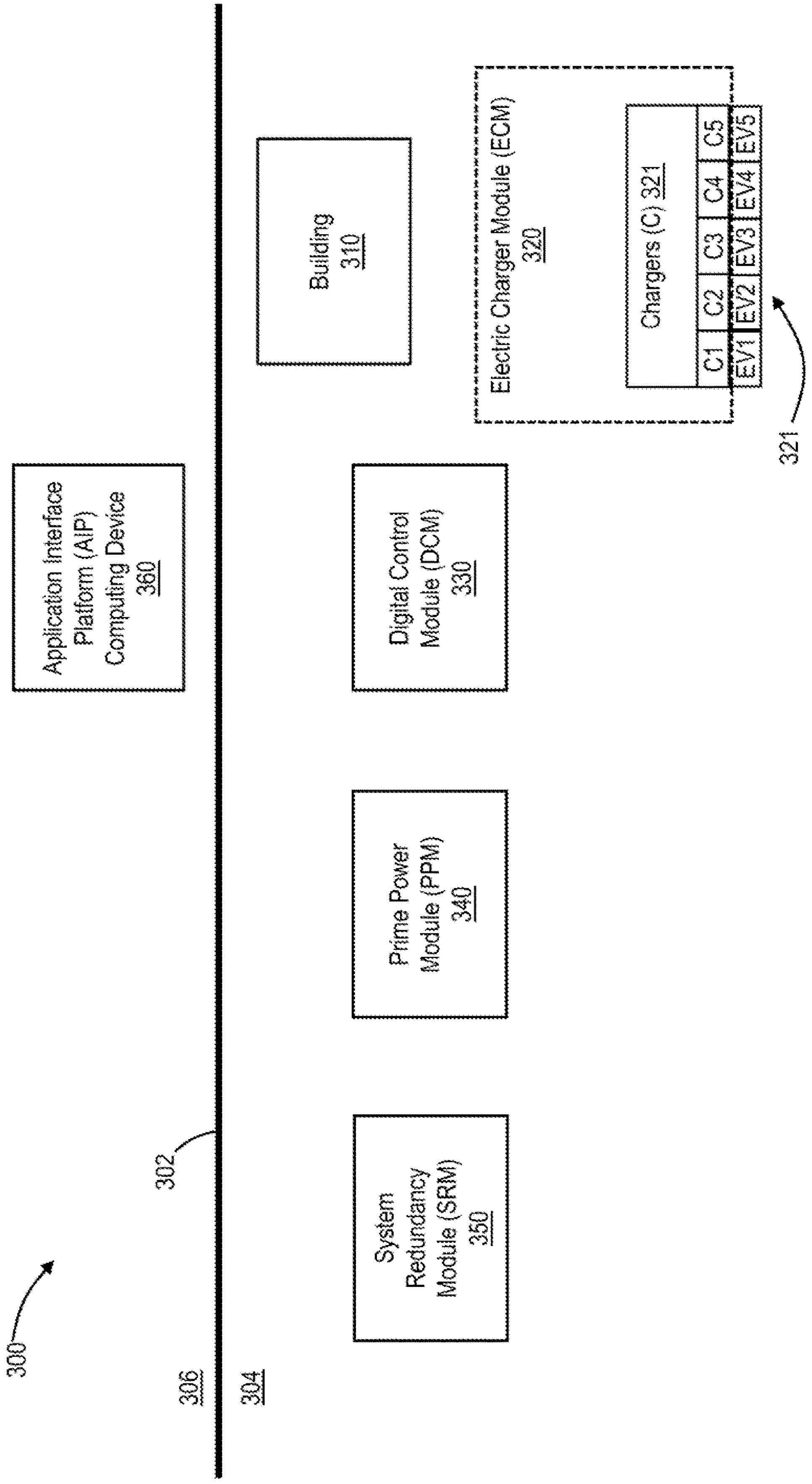
FIG. 3 is a block diagram of an integrated energy platform and electric vehicle charging (IEP-EV) system for enabling a private utility at a location including a building and an electric vehicle charging station, according to an embodiment.
Figure 4:
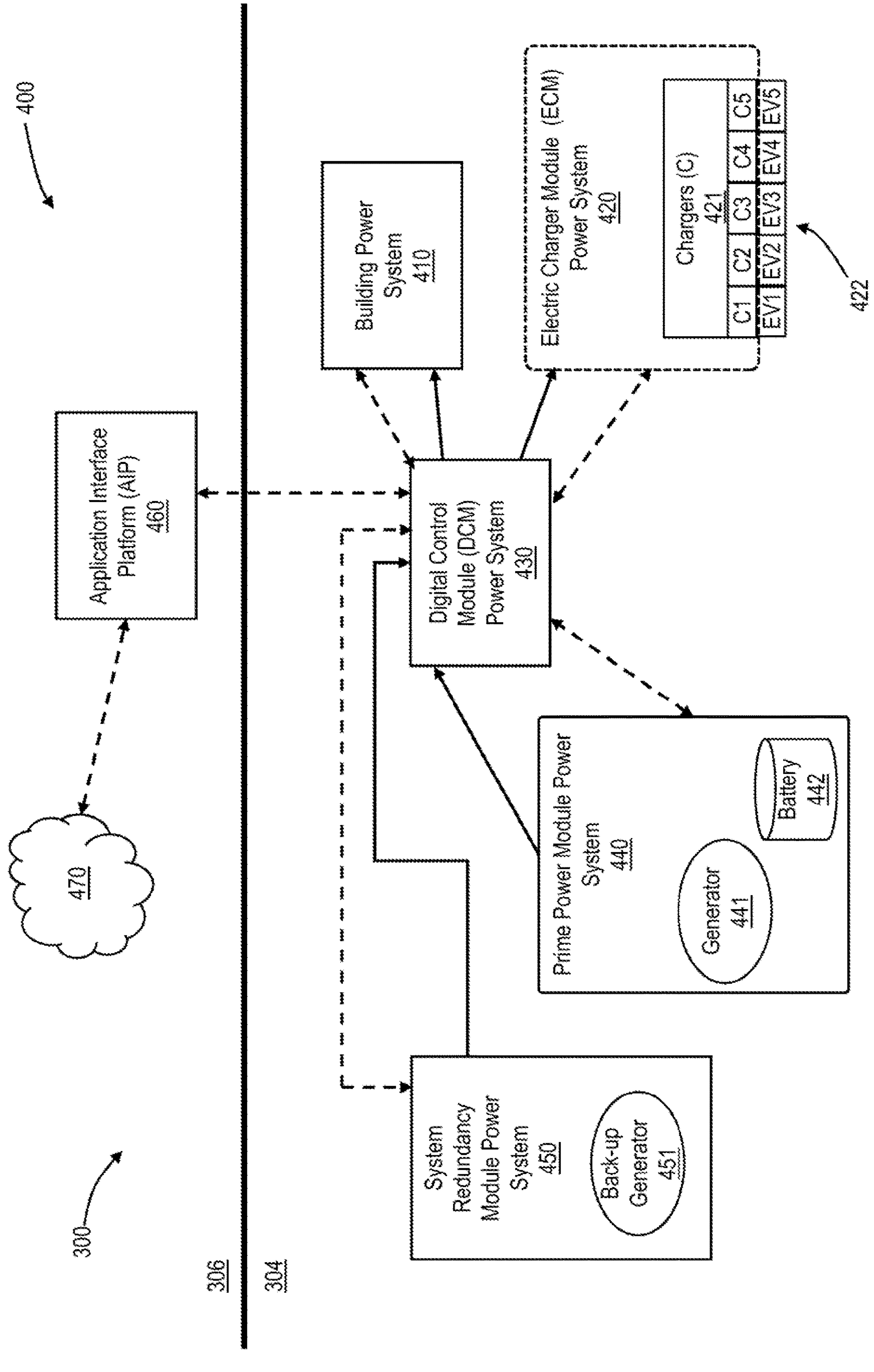
FIG. 4 is a block diagram illustrating further details of the IEP-EV system of FIG. 3 including the flow of power and data through the IEP-EV system, according to an embodiment.

Referring now to FIG. 3 shown therein is a block diagram of an integrated energy platform-electric vehicle (IEP-EV) system 300 for enabling a private utility at a location including a building and an electric vehicle charging station, according to an embodiment. FIG. 4 illustrates the flow of power and data through the IEP-EV system 300.

FIG. 3 is a block diagram of an integrated energy platform and electric vehicle IEP-EV system 300 for enabling a private utility at a location including a building with an electric vehicle charging station. In FIG. 3, each block represents an entity which includes components for operation of the IEP-EV system 300 including but not limited to power system components and computer system components (e.g. processing, storage, data communication components). The blocks below line 302 represent components on-site at the location 304 and the blocks above the line 302 represent off-site components 306. Offsite components 306 may be communicatively connected to onsite components 304 via a data communication network.

The IEP-EV system 300 includes a building 310, an electric charger module (ECM) 320, a digital control module (DCM) 330, a prime power module (PPM) 340, a system redundancy module (SRM) 350, and an offsite application interface platform (AIP) computing device 360. The ECM 320, DCM 330, PPM 340, and SRM 350 may each comprise a building or other structure/enclosure which houses/contains both power and computer components of each module. In other embodiments, any combination of the foregoing modules may be housed in the same building or in adjoining buildings, although it may be preferably for redundancy and safety concerns for certain modules to be separated (for example the PPM and the SRM).

Various aspects of the IEP-EV system 300 are described as communicatively coupled therebetween. The communicative coupling may be wired, wireless, or some combination thereof (is some circumstances wired may be preferred to minimize risks associated with loss of wireless internet). The communicative coupling may exist as a local area network (LAN).

The building 310 may be any building with power (i.e., electricity) requirements. The building 310 may be an industrial building, a commercial building, a residential building, an educational building, etc. The building 310 is communicatively coupled to the DCM 330 through a building computer system (not shown). The building 310 is electrically coupled to the DCM 330 through a building power system (not shown), which enables the transfer of power from the DCM 330 to the building 310.

The ECM 320 provides charging capabilities for electric vehicles. The ECM 320 includes electric vehicle chargers 321 (C1, C2, C3, C4, and C5). The chargers 321 are electrically coupled and communicatively coupled to the DCM 330. Present at the chargers 321 in FIG. 3 are five electric vehicles 322 (EV1, EV2 EV3, EV4, and EV5). The chargers 321 transmit data to the DCM 330 and deliver power to the EVs (when electrically coupled to the charger 321). The ECM 320 is a modular unit through which additional ECM units can easily be added to the IEP-EV system 300 or removed from the IEP-EV system 300 as demand at the building location dictates. Each modular ECM unit may include five chargers 321. In other embodiments, each module ECM unit may include more or fewer than five chargers. The ECM units may support both direct current (DC) EVs and alternating current (AC) EVs.

Each ECM 320 may include a variety of charger types, e.g., type 2 chargers, type 1 chargers, etc. The chargers may operate only at night or may be operable 24 hours a day.

In some embodiments, the ECM 320 may be a stand-alone building or structure which is remote from the other modules. In other embodiments, the ECM 320 may be bolted to the DCM 330. Where there are multiple ECMs 320 in an IEP-EV system 300, the ECMs 320 may be attached to each other or separate, and each ECM 320 may be attached to the DCM 330 or separate from the DCM 330.

The DCM 330 is an engineering station which manages the flow of power to the power loads at the building 310 and the ECM 320. The DCM 330 is communicatively coupled to the building 310, the ECM 320, the PPM 340, the SRM 350, and the application interface platform 360 through a DCM control subsystem. The DCM 330 is electrically coupled to the building 310, the ECM 320, the PPM 340, and the SRM 350 through a DCM power subsystem.

The PPM 340 is communicatively coupled to the DCM 330 through a PPM computer system. The PPM 340 includes a primary power source (not shown) which is electrically coupled to the DCM 330. The PPM 340 may be communicatively and electrically coupled to the SRM 350. The PPM 340 includes means for power generation. The means for power generation may be at least one generator. The PPM 340 may include a plurality of generators. The PPM 340 may include at least one battery to store power that can be used to supplement the generator(s) if there are high power requirements. The PPM 340 may be portable or may have modular units which can be added or removed depending on the power needs of the IEP-EV system 300.

The SRM 350 provides back-up power generation in the event that the PPM 340 fails. The SRM 350 is communicatively coupled to the DCM 330 through a SRM computer system. The SRM 350 includes a secondary power source which is electrically coupled to the DCM 330. The SRM 350 may be communicatively and electrically coupled to the PPM 340. The SRM 350 includes means for power generation. The means for power generation may be at least one generator. The SRM 350 may include a plurality of generators. The SRM 350 may include at least one battery to store power that can be used to supplement the generator(s) if there are high power requirements.

The DCM 330 receives power requirement data from the building 310 and the ECM 320. The power requirement data from the ECM 320 may include individual power requirement data for each charger 321 or may include overall power requirement data for the all the chargers 321. The DCM receives power availability data from the PPM 340 or the system redundancy module 350. The DCM 330 determines when and where power can be sent to the power loads. That is, where there is a greater requirement for power at the power loads (building 310 and ECM 320) than there is an availability of power, the DCM 330 determines which power load(s) will receive power and how much. The DCM 330 may receive and analyze more data than just the power requirement data and the power availability data. The DCM 330 may analyze, for example, historical power load requirement data, weather data, temperature data, etc., to determine where and when power is sent.

The AIP 360 is a platform which allows an administrator of the IEP-EV system 300 to monitor the operation of the on-site components 304 of the IEP-EV system 300 from an off-site computing device. Aspects or components of the AIP 360 may be available on multiple off-site computing devices. The AIP 360 may be automatically monitored and may be configured to flag and present, such as in a computer user interface, any issues which arise for review by an administrator.

FIG. 3 provides a high-level overview of the IEP-EV system 300 including onsite and offsite components 304, 306. FIG. 4 provides an overview of how the flow of power through the IEP-EV system 300 occurs and how it is controlled and monitored, according to an embodiment. The flow of power through the IEP-EV system 300 in FIG. 4 is represented by solid arrows. The flow of data through the IEP-EV system 300 in FIG. 4 is represented by dashed arrows.

The dashed arrows in FIG. 4 refer to the power load requirement data and the power availability data, described above, which is collected and used to determine and control the amount of power that is sent to the various power loads (i.e. the building 310 and EVs 321) at any given time. Additionally, external data relevant to the determination of how much power is sent to a given load at a given time is discussed, for example historical power requirement and power availability data, temperature data, and weather data. Other forms of data may be monitored, measured, collected, stored, analyzed and otherwise acted on within the IEP-EV system 300. For example, data which is required for normal operation of the system, safety data, current data, voltage data, or the like.

The specifics of power generation and power distribution in an integrated energy platform system without an appended electric charger module(s) are discussed in PCT/Canadian Patent Application No. CA2020050322, incorporated herein by reference. Such an integrated energy platform system, or portions thereof, may be implemented in the systems and methods described herein (including system 300).

FIG. 4 is a block diagram 400 illustrating further details of the IEP-EV system 300 of FIG. 3 including the flow of power and data through the IEP-EV system 300.

Referring to FIG. 4, IEP-EV system 300 includes a building power system 410 of building 310 of FIG. 3, an electric charger module (ECM) power system 420 of ECM 320 of FIG. 3, a digital control module (DCM) power distribution system 430 of DCM 330 of FIG. 3, a prime power module power system 440 of PPM 340 of FIG. 3, a system redundancy module power system 450 of SRM 340 of FIG. 3, an application interface platform (AIP) 460 at an external computing device, and a cloud server 470. Each power system 410, 420, 430, 440, 450 includes power generation/distribution hardware components as well as the computer components required for monitoring and controlling power generation and distribution (e.g., sensors, controllers, computing devices, etc.).

The DCM power distribution system 430 controls the generation and supply of power by the plurality of power sources, which include the PPM power system 440 and the SRM power system 450. The DCM power distribution system 430 includes a DCM power subsystem comprising all of the hardware required for supplying power to the power loads 422, 441, 451, and a DCM control subsystem which controls the various onsite components to ensure generation and supply of power to the building power system 410. The DCM control subsystem includes at least a controller and in most embodiments a PC computing device. The DCM control subsystem controls the safe operation and supply of power.

The DCM control subsystem of the DCM power distribution system 430 may adjust operating parameters of the PPM power system 440 and the SRM power system 450 according to control instructions. The operating parameters may include the on/off state of the power source (e.g. if the power source is active/enabled or inactive/disabled), the output level of the power source, etc. In a simple case, the DCM control subsystem may interpret data within the IEP-EV to enable the inactive power source and disable the active power source. The DCM control subsystem may adjust the operating parameters of the active and inactive PPM power system 440 and SRM power system 450.

The PPM power system 440 includes the primary power source for the IEP-EV system 300 and includes at least one generator 441, housed in or at the PPM 340 of FIG. 3. The PPM power system 440 may include between one and four generators. In other embodiments, the PPM power system 440 may include more than four generators. The PPM power system 440 includes at least one battery 442 to store power that can be used to supplement the generator(s) if there are high power requirements. The battery 442 may be charged by the generator 441. In other embodiments there may be additional generators in the PPM power system 440. The generators at the PPM power system 440 may be natural gas generators. The generators at the PPM power system 440 may use other non-renewable energy source (e.g. diesel) or renewable energy sources (e.g., solar, wind) or a combination thereof.

The SRM power system 450 serves as a back-up power system for the PPM power system 440. In the event that the PPM power system 440 cannot make enough power or cannot make any power, the SRM power system 450 is activated to generate power. The SRM power system 450 includes at least one back-up generator 451. The SRM power system 450 may include one or more batteries.

The PPM power system 440 and/or the SRM power system 450 (the power sources) send power to the DCM power distribution system 430. The DCM power distribution system 430 controls the flow of power from the power sources to the power loads and is capable of accepting full supply loads of power from the PPM power system 440 and/or the SRM power system 450. The DCM power distribution system 430 is housed in a DCM engineering station building which includes all of the power and computer components necessary for adequately safe transfer of power from the power sources to the power loads (building 310 and EVs 322). This includes but is not limited to: automatic breakers, current limiters, frequency limiters, voltage limiters, redundant (safety) relays, individual protection relays, etc. The DCM power distribution system 430 may be configured such that it meets all code requirements and preferably exceeds some code requirements.

The DCM power distribution system 430 sends power to the building power system 410. The building power system 410 powers any and all power-requiring devices (e.g., computing devices, servers, lighting, HVAC, appliances, machines, etc.) within the building 310.

The building power system 410 may include a plurality of types of intelligent end devices for collecting different data. The intelligent end devices may include balance of plant (BOP) equipment. The intelligent end devices may include supporting components and auxiliary equipment for delivering power other than the onsite power source (e.g. generator) itself. Examples of intelligent end devices include HVAC and protection relay equipment. The intelligent device data may include temperature data (inside and outside), electrical characteristics such as voltage, current, harmonics, or the like, breaker status, HVAC data, etc.

The building power system 410 may include simple transmitters. The transmitters may include a temperature transmitter, a pressure transmitter, a frequency transmitter, a heat transmitter, a fire or flame detector, a smoke detector, or the like. The transmitter may be an analog or digital device.

The DCM power distribution system 430 sends power to the chargers 421 at ECM 420 (shown in FIG. 4 with EVs 422: EV1, EV2, EV3, EV4, and EV5). Whether the ECM is remote from the DCM engineering station or the ECM is directly attached to the DCM engineering station, the DCM power distribution system 430 may have individual breakers and feeder cables which connect to each individual charger C1, C2, C3, C4, and C5 at the ECM. This allows the DCM power distribution system 430 to control distribution of power to each individual charger directly from the DCM power distribution system 430.

The DCM control subsystem analyzes data from the IEP-EV system 300 to determine how to distribute power to the power loads. The DCM controller may be an input/output (I/O) controller. The controller may have the capacity to handle I/Os at a level in the thousands (e.g., 20,000-40,000 I/Os), for example an Emerson Delta V I/O programmable logic controller with its own processor, or may have a lower capacity of I/Os (e.g. 30-40 I/Os), for example a ComAp I/O controller which has less memory. The DCM control subsystem may further include a personal computer (PC) or similar device to process the data and perform the calculations required for the controller to determine how to distribute the power to the loads. This is particularly important in a case where the controller has a lower I/O capacity and has limited processing capabilities, as more complicated calculations may "slow down" a controller with less processing power/memory. If the controller is an "off-the-shelf" controller from a third party, the controller may include added logic for implementing the IEP-EV system 300 (e.g., what loads can the chargers handle, etc.).

The DCM control subsystem receives data from the on-site components of the IEP-EV system 300 including the PPM power system 440, the SRM power system 450, the building power system 410, the ECM power system 420, and components within the DCM power distribution system 430 itself. The DCM powers system 430 also receives data from off-site components of the IEP-EV system 300 including the AIP 460 computing device and the cloud server 470.

The DCM control subsystem is constantly receiving power load requirement data from the power loads and power availability data from the power source(s) and can instantaneously respond if necessary. The DCM control subsystem analyses the data and determines which power loads will receive power. The DCM control subsystem may include logic which uses a hierarchy of power loads and determines which power loads receive power according to the hierarchy. That is, the DCM control subsystem may prioritize certain power loads over others. For example, the DCM may prioritize power loads directed to heating to the building over charging an EV. In a simplified example: if the supply of power available is 100 units and the needs of the building are 20 units, then 80 units are available for the EV chargers, but if the needs of the building rise to 40 units then only 60 units will be available to the EV chargers as the building is higher in the power load determination hierarchy than the EV chargers.

The DCM control subsystem receives building power load requirement data from the building power system 410. The power needs of the building power system 410 may be separated into several individual loads for various circuits of the building power system 410. The building power system 410 may have redundancies. The building power load requirement data may be stored at both the DCM control subsystem and at an off-site data storage device.

The DCM control subsystem receives EV charger power load requirement data from the ECM power system 420. Each individual charger at the ECM is communicatively coupled with the DCM control subsystem, either directly or indirectly. When the communication is indirect each EV charger may communicate directly with a master supervisor device which then communicates directly with the DCM control subsystem. Each charger may have an internet or other network connection for wirelessly communicating with the DCM control subsystem or the master supervisor device. Each charger receives information from a plugged-in EV to know what the needs of that EV are, for example, how much power and how much time does the EV battery need to reach a certain level of charge. The DCM control subsystem is capable of analyzing the needs at each EV charger 421 against the needs of the entire IEP-EV system 300 and determining if the IEP-EV 300 system is capable of allowing an individual EV charger 421 to receive power at that time. The DCM control subsystem communicates with each individual EV charger 421 via a communication protocol, such as modbus, which tells the EV charger 421 to be either off or on.

The determination of whether an EV charger 421 can be on or off may be performed constantly. That is, an EV charger 421 which is already on and charging a coupled EV 422 may be shut off if necessary for the health of the IEP-EV system 300. Fortunately, there is no damage to the charger 421 or the EV 422 if charging is shut off "mid-charge", though reaching a full charge of the EV 422 may require an increased total charging time. In some circumstances, it may be required to turn off more than one EV charger 421 and, in that case, when the load requirements of the IEP-EV system 300 decrease enough to allow an EV charger 421 to be turned back on the DCM control subsystem may determine that a specific EV charger 421 needs to be turned on first. The specific needs of each individual charger 421 (based on the needs of the specific EV 422 plugged into the charger 421 at a given time) may be included in the power hierarchy logic of the DCM control subsystem. The DCM control subsystem may also take into consideration whether an EV 422 needs to be charged to a certain amount by a certain time. For example, it may be known that when an EV 422 is plugged in after a certain time of day (after working hours) the vehicle only needs to be fully charged by the next morning (start of working hours) and therefore the DCM controller may choose to send power to the charger 421 at night during off-peak building load hours.

The DCM control subsystem may also receive external data from the AIP 460 or indirectly from a cloud server 470 through the AIP 460. This external data may include historical IEP-EV data which has been stored at an external or networked data storage device such as the cloud server 470. In some embodiments, recent historical data may be stored locally on a DCM computing device. For example, data collected from the IEP-EV may be stored at intervals of every second for the last ten days, every five minutes for the last month beyond the ten days, and down to every fifteen minutes for the last six months at the DCM computing device, but may be stored at an offsite storage device (e.g., cloud server 470) at intervals of every second for the last year or even the entire history of the IEP-EV. An example of when the DCM control subsystem may use the historical IEP-EV data is when the load requirements of the IEP-EV system 300 are approaching the current capacity of the system and the DCM controller needs to determine whether or not to turn off at least one charger 421 (or another load). The DCM control subsystem may consider the historical IEP-EV data for the time of day and at the time of year to determine if the load requirements of the building 310 are likely to go down soon and therefore it is unnecessary to shut off a charger 421.

The analysis of historical IEP-EV data makes the IEP-EV system adaptable for the needs of different IEP-EV systems. For example, the needs of an IEP-EV system at an apartment building may be different from those at an office building and as the data is analyzed over time these differences may become apparent resulting in a change to the power distribution and power source usage logic which is applied by the DCM control subsystem when determining how to distribute power.

The DCM control subsystem may receive external data from the AIP 460, other computing devices, or on-site sensors regarding the historical, current, and/or forecast environmental conditions at the building 310 (temperature, wind, precipitation, etc.). Historical environmental data may be used to compare the past requirements of the IEP-EV system 300 during specific environmental conditions to the current or forecast environmental conditions so the DCM control subsystem can predict the building power load requirements when determining how power should be distributed to the various loads. For example, if the temperature is going to be very cold overnight the DCM control subsystem may predict that the building will require more power for the heating systems and that it may be necessary for fewer chargers 421 to be operating simultaneously.

The AIP 460 includes an image of the DCM control subsystem. When the DCM control subsystem includes a PC computing device which performs data analysis, the AIP 460 may create an image of the PC on a server. The AIP 460 is most often offsite but may be present onsite. The AIP 460 includes a graphical user interface (GUI) which displays information from the DCM control subsystem including current IEP-EV parameters and possibly historically relevant data and may display historical environmental data, or current/forecast environmental data which is pulled from the internet. In an embodiments, where the IEP-EV is connected to a local utility or where there is a back-up system which is connected to a local utility, local utility information may be displayed on the GUI. The historical data may be stored on and accessed from the cloud server 470 (cloud server 470 may, in actuality, include multiple servers). Access to the GUI of the AIP 460 may be available from any device including a client application configured to communicate with the AIP and display a user interface.

The AIP 460 is communicatively coupled to the DCM control subsystem and sends external data to the DCM control subsystem (data which the DCM control subsystem cannot access onsite, e.g., historical data which is not stored locally, forecast environmental data, etc.) for the DCM control subsystem to analyze and act on if necessary. The AIP 460 is discussed in greater detail below.

The AIP 460 is configured to integrate and remotely manage, monitor, and dispatch generating, facility, and balance of the IEP-EV system 300. The AIP 460 may create secure, reliable, economic and environmental benefits for the IEP-EV location. The AIP 460 may enable the dispatch, operations, and maintenance functions to be conducted safely and autonomously or safely and remotely in real time.

The AIP 460 processes multiple digital inputs from many complex processes and may provide a simple-to-use reliable, remote intelligent management platform. The AIP 460 may perform any one or more of economic dispatch, severe weather reinforcement, facility load balancing, power export, emergency reaction/recover and power quality control. The AIP 460 allows multiple stakeholders to safely monitor the IEP-EV system 300. The AIP 460 facilitates the convergence of internet and energy technologies.

The AIP 460 may provide security benefits. The AIP 460 creates an image of the actual IEP-EV system 300 from live and historical data. The AIP 460 can accept write instructions that are sent to a database for further processing. The IEP-EV system 300 is not exposed or accessed directly by the internet client.

The AIP 460 may provide reliability. The AIP 460 may provide reduced electricity supply risk due to multiple, built-in redundancies. The AIP 460 may include automatic severe weather and load balancing features. The AIP 460 may be configured to monitor severe weather in real time and in advance of a storm using accessible weather data and adjust the host site to adapt power generation and distribution to any weather-related events or outages. The AIP 460 may provide real time sensing of transient and dynamic conditions on the electrical grid enables appropriate load balancing to ensure system performs safely and efficiently. The AIP 460 may also operate on a variety of manufacturers equipment and inputs devices allowing quick and easy parts replacement.

The AIP 460 may include a communications module that provides an administrative interface for configuring local and remote Ethernet and Serial Pathways and addressing. The communications module may collect, concentrate, and condition raw data for output to a database module.

The database module compiles, manages, and populates databases. The database module provides persistent storage and customizable rollover archiving. The AIP 460 may include an administrative interface for configuring any one or more of data historians, administrative tools interface for database management, and file health and data integrity.

The AIP 460 may include a reporting module. The reporting module conditions data into client specific human readable formats. The reporting module provides custom tailored user-specific reporting. The reporting module facilitates access to historical data.

The AIP 460 may include a web app module. The web app module provides user-specified data via ethernet and internet to local and remote client devices. The web app module auto updates at specified refresh rates to display gathered real time data. The web app module provides limited but secure read/write access to configured intelligent end devices and components. The web app module provides user specific and requested data to a graphical user interface.

The AIP 460 may include a severe weather module. The severe weather module may provide a preconfigured user specific set-points for "one touch" command via the web app module.

The AIP 460 may include a node pinger module. The node pinger module provides an administrative tools interface for database management, file health and data integrity. The node pinger module notifies administrative personnel of site communications interruptions.

The AIP 460 may include an internet protocol (IP) check module. The IP check module monitors dynamic IP addresses for changes and provides system updates.

The AIP 460 may include a severe weather forecasting module. The severe weather forecasting module monitors and scrapes internet weather data in real time for configured sites and client specific locations. The severe weather forecasting module provides data to the web app module.

The AIP 460 may include a commodities module. The commodities module monitors commodities and provides data to web app module. The commodities module notifies specified users when prices rise above preset thresholds. The commodities module activates a dispatch process when prices rise above preset thresholds. The commodities module deactivates the dispatch process when prices fall below preset thresholds.

The AIP 460 may include an emissions module. The emissions module calculates raw emissions data acquired from sensors and endpoints. The emissions module provides data to the web app module.

The AIP 460 may include a load balancing module. The load balancing module provides real time sensing of transient and dynamic conditions on the electrical grid. The load balancing module enables appropriate load balancing to ensure system performs safely and efficiently.

Figure 5:
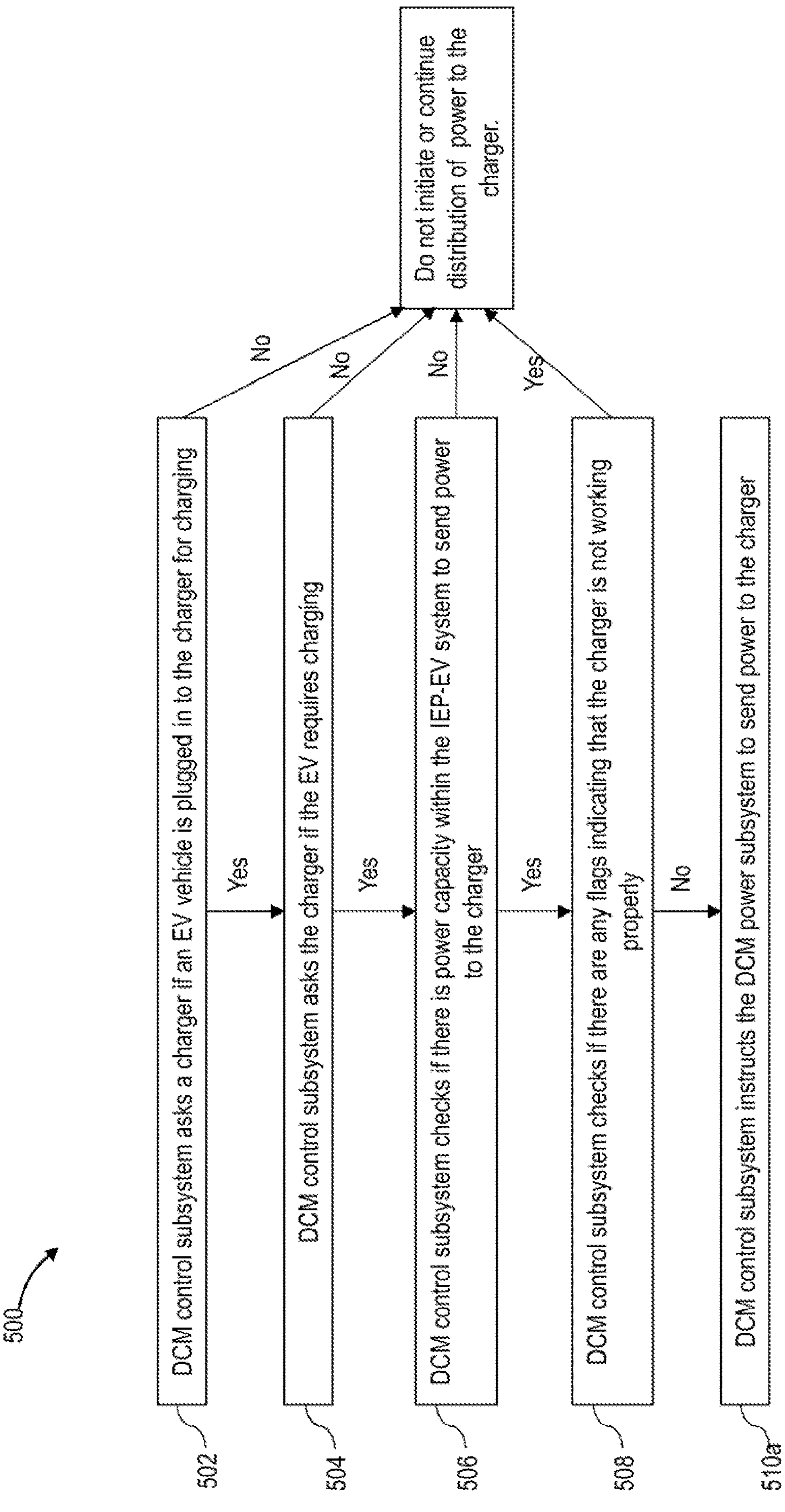
FIG. 5 is a flow diagram of a method of determining if an electric vehicle charger can charge an electric vehicle using an IEP-EV system such as the system of FIG. 3, according to an embodiment.

FIG. 5 is a flow diagram of a method of determining if an electric vehicle charger can charge an electric vehicle, in accordance with an embodiment.

At 502, the DCM control subsystem sends a message to the charger 421 asking the charger 421 if an EV 422 is plugged in to the charger 421. This request may be sent continually at some predefined interval of time, for example, every second.

At 504, if the answer in 502 is yes, the DCM control subsystem sends a message to the charger 421 asking the charger 421 if the EV 422 requires charging. If the EV 422 is already fully charged the answer will be no. If the EV 422 is not fully charged the answer will be yes.

At 506, if the answer in 504 is yes, the DCM control subsystem checks if there is currently the capacity within the IEP-EV system 300 to send power to the charger 421 and if there will predictably be the capacity within the IEP-EV system 300 to send power to the charger 421 for the foreseeable future (which may be a defined future period of time).

At 508, the DCM control subsystem checks for flags at the charger 421 to monitor that the charger 421 is functional and there are no issues and the charger 421 is operating properly. If there is a flag or flags the control subsystem may discontinue sending power to the charger 422 if power at that time was being transferred to the charger 421 or may not allow power to be sent to the charger 421 until the flag(s) is cleared (wherein clearance of such flag may be effected through communication between the charger 421 and the DCM control subsystem).

At 510*a*, if the answer to 506 is yes and there are no flags at 508, the DCM control subsystem instructs (or continues to instruct) the DCM power distribution system 430 to direct power to the charger 421.

At 510*b*, if the answer to any of 502, 504, or 506 was no or if there are flags at 508, then the DCM control subsystem does not initiate or continue distributing power to the charger 421 by the DCM power subsystem 430.

The entire process from 502-510 may be a constantly occurring process and if the answer to any of the requests is no or if there is a flag present, the DCM control system may not initiate distribution of power to the charger 421 or may stop distribution of power to the charger 421, as appropriate.

The instructions involved in the above process may be simple read/write questions with yes/no answers.

In some embodiments, each charger 421 interacts directly with the DCM control subsystem, while in other embodiments the chargers 421 send information to a master supervisor device at the ECM 420 which interacts directly with the DCM control subsystem. The chargers 420 may include a network communication interface and an internet connection to wirelessly communicate with the DCM control subsystem or the master supervisor device.

While the above description provides examples of one or more apparatus, methods, or systems, it will be appreciated that other apparatus, methods, or systems may be within the scope of the claims as interpreted by one of skill in the art.

The invention claimed is:

1. An on-site integrated energy power and electric vehicle (EV) charging (IEP-EV) system including:

- a plurality of power loads including:
  - at least a first building; and
  - an electric charger module including at least a first electric vehicle (EV) charger for charging an electric vehicle when coupled to the EV charger; and
- at least a first on-site power source to provide power to the plurality of power loads;
- an on-site digital control module (DCM) power distribution system including:
  - a DCM control subsystem communicatively coupled to the first power source, the first building, and the electric charger module, the DCM control subsystem configured to:
    - receive first power source data from the first power source, the first power source data including at least power availability data of the first power source;
    - receive load data from the first building and the first electric charger module, the load data including at least power requirement data of the first building and the electric charger module;
    - determine, based on the first power source data and the load data, a plurality of power amounts to send to each of the plurality of power loads respectively, including a first power amount to the first building and a second power amount to send to at least the first EV charger of the electric charger module;
  - a DCM power subsystem electrically coupled to the first power source, the first building, and the electric charger module, the DCM power subsystem configured to:
    - receive power from the first power source; and
    - send the first power amount to the first building and the second power amount to the electric charger module;
- an off-site application interface platform (AIP) computing device communicatively coupled to the DCM control subsystem for monitoring the IEP-EV system from off-site, the AIP computing device further configured to:
  - create a system image of the IEP-EV system from live and historical data; and
  - provide a graphical user interface (GUI) for presenting current and historical IEP-EV system parameters to a client application running on a client device, the client application configured to display the GUI, wherein the IEP-EV system is not exposed or accessed directly by the client application;
- wherein the IEP-EV system is configured to operate when isolated from a local public utility power grid.

2. The system of claim 1, wherein the DCM control subsystem includes a programmable logic controller for receiving the first power source data and the load data and determining at least the first power amount and the second power amount.

3. The system of claim 1, wherein the DCM control subsystem includes a chip-based control system.

4. The system of claim 1, wherein each power load of the plurality of power loads is assigned a hierarchical value and wherein the DCM control subsystem determines the plurality of power amounts using the hierarchical values of each power load.

5. The system of claim 1, wherein the electric charger module includes:

- an electric charger module (ECM) master supervisor device communicatively coupled to each of the first EV charger, at least a second EV charger, and the DCM control subsystem;
- wherein the ECM master supervisor device is configured to receive load data from at least the first and second EV chargers and transmit the load data to the DCM control subsystem; and
- wherein the DCM control subsystem determines the plurality of power amounts to be sent to the electric charger module including a second power amount to be sent to the first EV charger and a third power amount to be sent to the second EV charger.

6. The system of claim 1, further including a second power source which is redundant with the first power source, wherein the DCM power subsystem is configured to receive power from the second power source.

7. The system of claim 1, wherein the DCM control subsystem determines the plurality of power amounts based on additional data, wherein the additional data includes at least one of historical load data from the plurality of power loads, weather data, and temperature data.

8. The system of claim 1, wherein the DCM power distribution system includes individual breakers and feeder cables for connecting to each EV charger at the electric charger module.

9. The system of claim 1, wherein the AIP computing device is configured to communicate historical external data not stored onsite by the DCM control subsystem, and wherein the DCM control subsystem is further configured to receive the historical external data from the AIP computing device and adjust power generation and power distribution according to the historical external data.

10. The system of claim 1, wherein the AIP computing device is configured to monitor weather data in real time and communicate severe weather data to the DCM control subsystem to adjust power generation and power distribution according to the severe weather data.

11. A method of enabling a private utility system at a building with an electric charger module including at least a first charger for charging electric vehicles, the method comprising:

isolating the private utility system from a local public utility power grid;

providing a plurality of onsite power sources, wherein a first power source is enabled to provide power to at least the building and the first charger;

determining a first power requirement of the building and a second power requirement of the electric charger module;

determining a power availability of the first power source;

adjusting a first amount of power provided to the building and a second amount of power provided to the at least a first charger based on the power availability, the first power requirement, and the second power requirement creating a system image of the private utility system from live and historical data; and providing a graphical user interface (GUI) for presenting current and historical private utility system parameters to a client application running on a client device, the client application configured to display the GUI, wherein the private utility system is not exposed or accessed directly by the client application.

12. The method of claim 11, wherein the building and the first charger are assigned a first hierarchical value and a second hierarchical value, respectively, and wherein changing the first amount of power and the second amount of power is further based on the first hierarchical value and the second hierarchical value.

13. The method of claim 11, wherein a second power source is enabled to provide power to the building and the electric charger module when the first power source is disabled.

14. The method of claim 11, wherein determining the second power requirement of the electric charger module comprises:

determining if an EV is plugged into the first charger; and determining if the EV requires charging.

15. The method of claim 14, wherein determining the first power availability of the first power source comprises:

checking if the first power source has a current capacity to send power to the first charger; and predicting if the first power source has a future capacity to send power to the first charger for a defined period of time.

16. The method of claim 15, further comprising:

monitoring one or more flags at the first charger to ensure the first charger is operating properly, wherein if there is a flag, discontinuing the second amount of power provided to the first charger until the flag is cleared, wherein if there is no flag, providing the second amount of power to the first charger.

* * * * *